Figure 1:
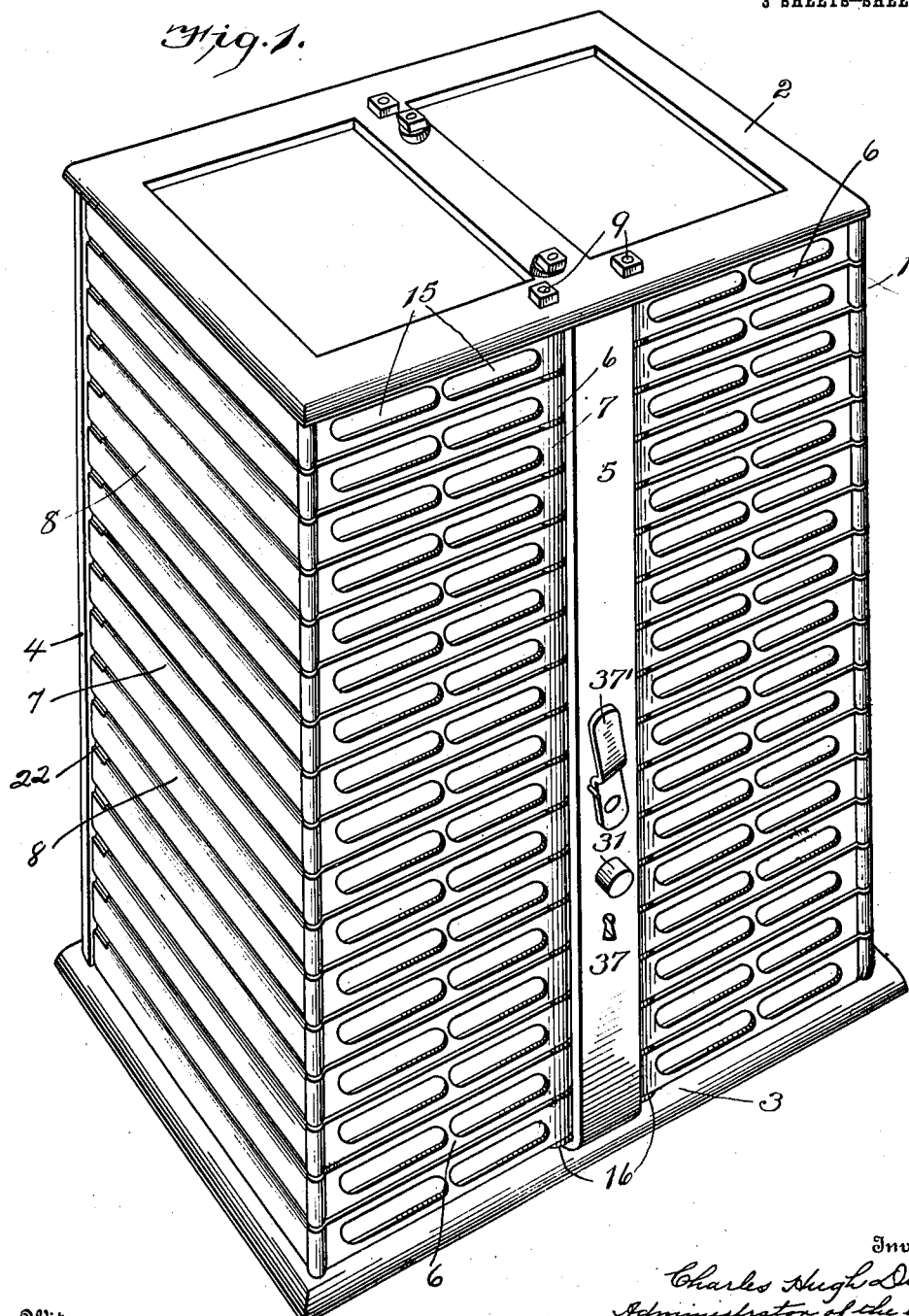

W. L. DUNHAM, DEC'D.
C. H. DUFFY, ADMINISTRATOR.
FILING CABINET.
APPLICATION FILED FEB. 27, 1909.

982,767.

Patented Jan. 24, 1911.

W. L. DUNHAM, DEC'D.
C. H. DUFFY, ADMINISTRATOR.
FILING CABINET.
APPLICATION FILED FEB. 27, 1909.

982,767.

Patented Jan. 24, 1911.

3 SHEETS—SHEET 2.

Witnesses
J. F. Britt
E. C. Duffy

Inventor
Charles Hugh Duffy
Administrator of the estate
of William L. Dunham, dec'd.

By
Attorneys

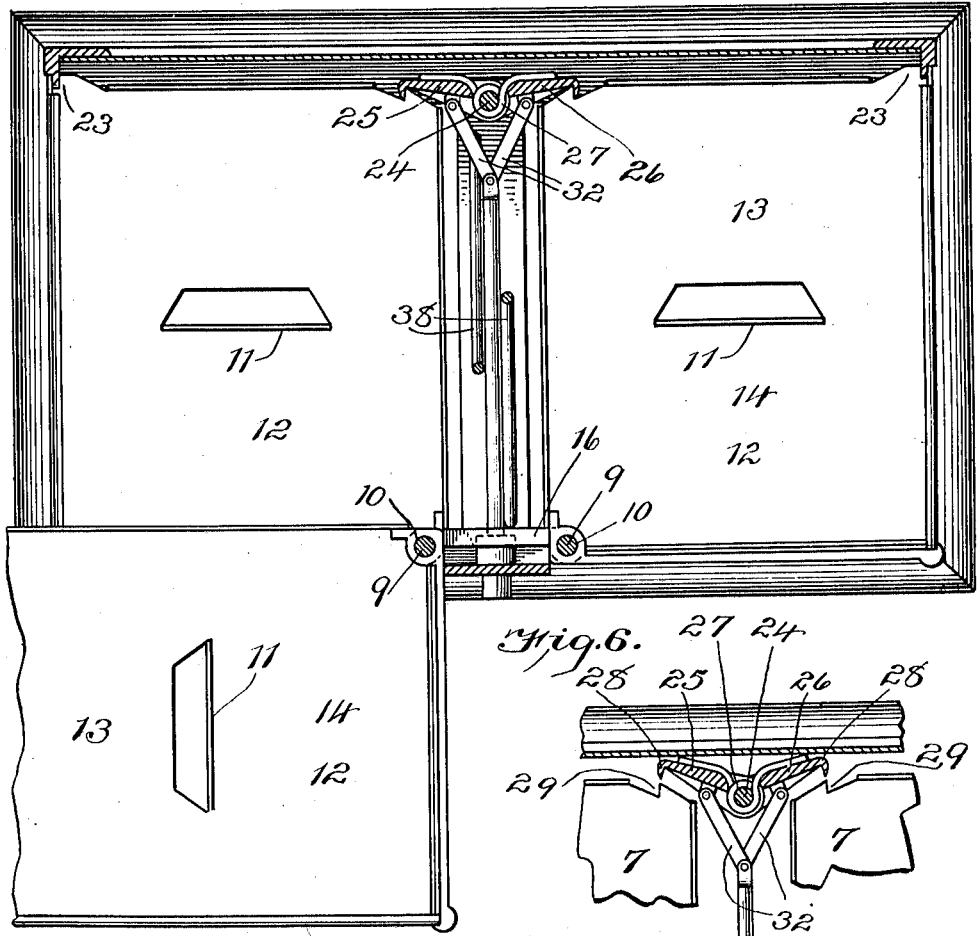

UNITED STATES PATENT OFFICE.

CHARLES HUGH DUFFY, OF WASHINGTON, DISTRICT OF COLUMBIA, ADMINISTRATOR OF WILLIAM L. DUNHAM, DECEASED, ASSIGNOR OF FORTY-SEVEN AND ONE-HALF ONE-HUNDREDTHS TO LEWIS M. RHINEHART, FORTY-SEVEN AND ONE-HALF ONE-HUNDREDTHS TO CLARENCE H. MURPHY, AND FIVE ONE-HUNDREDTHS TO WILLIAM S. TERRY, ALL OF WASHINGTON, DISTRICT OF COLUMBIA.

FILING-CABINET.

982,767.            Specification of Letters Patent.     Patented Jan. 24, 1911.

Application filed February 27, 1909. Serial No. 480,463.

*To all whom it may concern:*

Be it known that WILLIAM L. DUNHAM, deceased, late a citizen of the United States, residing at Washington, in the District of Columbia, did invent certain new and useful Improvements in Filing-Cabinets, and that I, CHARLES HUGH DUFFY, a citizen of the United States, residing at Washington, in the District of Columbia, administrator of the estate of the late WILLIAM L. DUNHAM, do declare the following to be a full, clear, and exact description of the invention of the late WILLIAM L. DUNHAM, such as will enable others skilled in the art to which it appertains to make and use the same, reference being had to the accompanying drawings, and to the letters and figures of reference marked thereon, which form a part of this specification.

This invention relates to the class of filing cabinets and has for its object to provide a device of this class which is particularly designed to be employed for the convenient filing of small slips or bills such as are usually employed by certain classes of merchants such as grocers or the like.

It has become almost a universal custom for merchants such as grocers to employ a small duplicate slip or bill to accompany the goods which are purchased by customers on credit the merchant filing away in a convenient receptacle one copy of the slip or bill while the customer files away a copy of the same in such manner that a careful record of the articles purchased and the amount of the purchase is readily accessible at any time either by the merchant or by the customer in such manner that the accounts are always in accord.

This invention therefore has for its object to provide a simple inexpensive and easily operated filing cabinet for the use of merchants in order to conveniently file the slips containing the articles and amounts of the purchases of customers.

With this object in view this invention consists in the novel construction of the cabinet and particularly in the novel construction and arrangement of the swinging drawers.

This invention also consists in the novel construction and arrangement for supporting the swinging drawers.

This invention further consists in the novel construction and arrangement for locking the drawers, and in certain other novel details of construction and in combinations of parts, all of which will be first fully described and afterward specifically pointed out in the appended claims.

Figure 2:
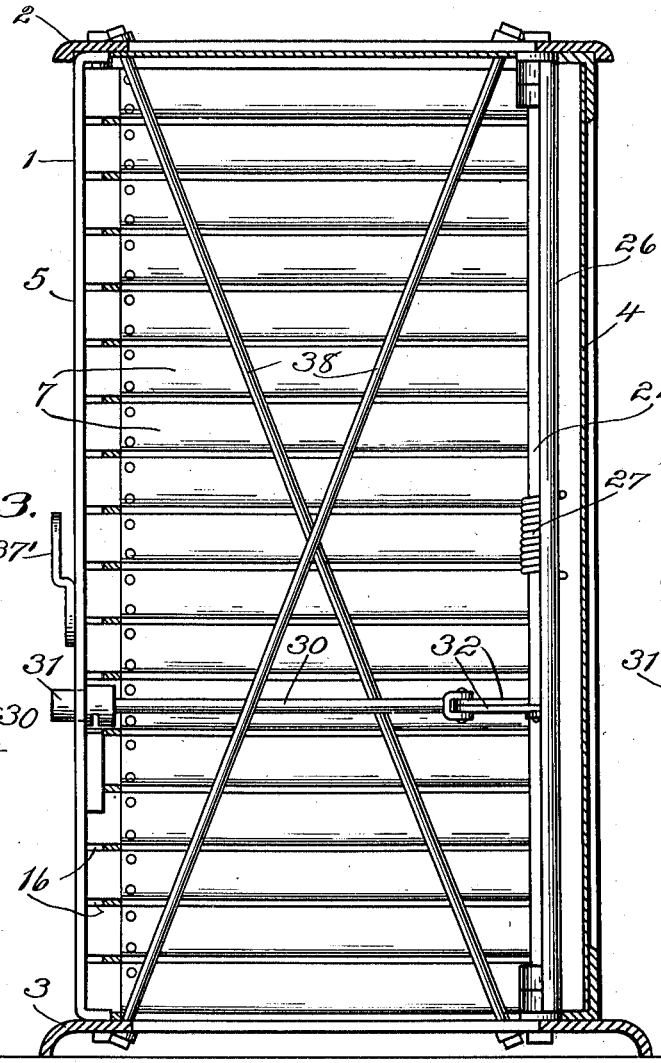
Figure 3:
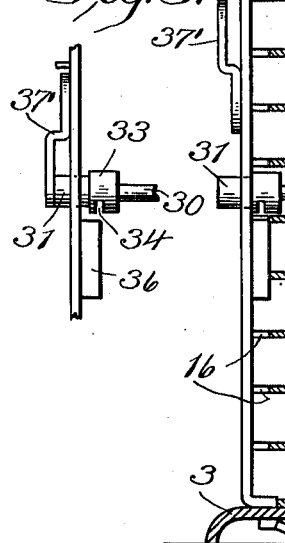
Figure 4:
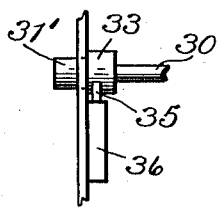
Figure 5:
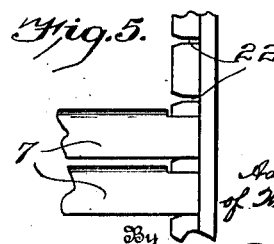

Referring to the accompanying drawings: Figure 1 is a perspective view of a filing cabinet constructed in accordance with this invention. Fig. 2 is a vertical transverse sectional view through the same. Fig. 3 is a fragmentary view of the push button and keeper for operating the locking mechanism. Fig. 4 is a fragmentary view illustrating the push rod in a locked position. Fig. 5 is a fragmentary view illustrating the construction for supporting one corner of the drawers. Fig. 6 is a horizontal sectional view through the cabinet showing one of the drawers in an open position. Fig. 7 is a fragmentary horizontal sectional view illustrating the locking mechanism. Fig. 8 is a plan view of the double washer employed between the drawers, and Fig. 9 is a vertical sectional view through the journal of one of the drawers and washers.

Like numerals of reference indicate the same parts throughout the several figures, in which;

1 indicates the filing cabinet which comprises the top frame 2, bottom 3, back 4 and front 5. As will appear from Fig. 1 the cabinet is provided with no sides and the fronts 6 of the drawers 7 form the front of the cabinet, the front piece 5 being merely a vertical partition strip which is arranged between the drawers 7 as is clearly shown. It will also appear from Fig. 1 that the sides 8 of the drawers 7 form the sides of the cabinet. The cabinet being provided with no side pieces allows the drawers 7 to be swung outwardly into position shown in Fig. 6.

The drawers 7 are arranged vertically one above the other in two lines or columns as is clearly shown in Fig. 1, a vertical post 9 being provided on each side of the front strip 5 upon which the drawers 7 swing. Each of the drawers 7 is provided with a perforation or journal 10 at the inner forward corner of the drawer and the said vertical posts 9 pass through these perforations or journals 10 thus forming a bearing in such manner that each of the drawers in both lines or columns of drawers are free to be swung outwardly in position shown in Fig. 6. As will appear now from Fig. 6 a partition 11 is struck up from the bottom 12 of each of the drawers in order to divide each of the drawers into two compartments 13 and 14, and as will appear from Fig. 1 the front 6 of each of the drawers 7 is provided with two elongated openings 15 to accommodate two name cards in each drawer, the name cards appearing in the openings 15 corresponding with the bills or slips in the compartments 13 and 14 within the drawer in such manner that each drawer is utilized for two separate and distinct accounts.

Referring now to Figs. 6, 8 and 9 it will be seen that between each pair of drawers 7 there is provided a double washer 16, said double washer 16 being provided with a connecting link 17 and a perforated portion 18 at each end thereof, the double washer 16 being passed over both of the vertical posts 9 as is clearly shown in Fig. 6. It will also be seen from Figs. 8 and 9 that a depression 20 is formed at each end of the washer 16, said depression lying transversely of the cabinet, and each of the drawers is provided with a corresponding tongue 21 registering and entering the depression 20 in the washer 16 when the said drawer is in a closed position. By reason of the double washer and the depressions therein and the tongue 21 in each of the drawers all tendency of one drawer opening another is eliminated. In order, however, to further support the drawers and to prevent the accidental dragging of one drawer with another there is provided a series of notches 22 (Fig. 5) at each corner of the back 4 of the cabinet, and upon the outer rear corner of each of the drawers there is provided an extension 23 (Fig. 6), the extension 23 on each of the drawers entering a notch 22 in the outer corner of the back 4 as is clearly shown in Figs. 5 and 6. Consequently when the drawers are in a closed position as shown in Fig. 1 the inner corner of each of the drawers is separated from its adjacent drawer, and the outer rear corner of each of the drawers is supported in the notch 22 in the back of the cabinet and consequently separated from its adjacent drawer. By this construction all tendency of dragging of one drawer on another is entirely obviated to such an extent that one or more of the drawers can be opened simultaneously or successively without disturbing or moving any of the remaining drawers. Were it not for the construction just described the opening of one drawer would have a tendency to carry with it one or more of its adjacent drawers owing to the dragging of one drawer on another.

Referring now to Fig. 6 it will be seen that centrally of the cabinet and adjacent the back thereof there is provided a vertical post 24 upon which is hinged two locking plates 25 and 26, said locking plates being provided with a spring 27 which normally forces said locking plates toward the front of the cabinet. It will also be seen that each of the locking plates 25 and 26 is provided with a hook or flange 28 at its outer or free end, and it will also be seen from Fig. 6 that each of the drawers 7 is provided with a notch 29 within which the hooks or flanges 28 on the locking plates 25 and 26 enter in order to simultaneously lock each line or column of drawers in a closed position. 30 indicates a push rod upon which there is provided a push button 31, said push rod 30 being connected to two links 32 at its rear end which links 32 are in turn connected to the locking plates 25 and 26 in such manner that upon depression of the push rod 30 both of the locking plates 25 and 26 are forced rearwardly into position shown in Fig. 7, thus simultaneously releasing all of the drawers 7. Upon the release of the push rod 30 the hooks or flanges 28 on the locking plates 25 and 26 can enter the notches 29 in the drawers 7 and lock the same in a closed position. In order to securely lock the drawers so that they cannot be opened by depressing the push button 31 there is provided a collar 33 upon the push rod 30 and a notch 34 in the collar 33, said notch being designed to receive the locking bolt 35 contained within the lock 36 directly under the push rod 30, said lock 36 being operated by means of a key inserted within the key hole 37 in the front plate 5. By this means the push rod 30 can be securely locked against movement in order to effectually lock the drawers in a closed position. During business hours a merchant has occasion to open the drawers of the cabinet many times a day, and in order to prevent the successive depression of the push button 31 there is provided above the push button 31 on the front plate 5 a pivoted plate 37' in such manner that said plate 37' can be swung down over the push button 31 in order to hold said push button in a depressed position, thus unlocking all of the drawers. When the push button 31 is in this position any one or more of the drawers in either column or line can be successively opened.

As will appear from Fig. 2 there is provided centrally of the cabinet and extending obliquely from front to rear two stay or brace rods 38 in order to securely brace the cabinet and to prevent collapsing of the same.

Having thus described the several parts of this invention its operation is as follows: Suitable name cards having been provided in the fronts of the drawers 7 any one or more of the drawers can be thrown into position shown in Fig. 6 by depressing the push button 31 in order to place within the drawer or remove therefrom a slip or bill. After this has been accomplished the drawer is again closed into its normal position.

What is claimed as new and is desired to be secured by Letters Patent of the United States is:—

1. A filing cabinet comprising two columns of drawers, the drawers of each column being arranged one above the other, a vertical post for each column of drawers upon which posts the said drawers are journaled at their inner front corners, a double washer extending over both vertical posts and arranged between two adjacent drawers in both columns, each washer being provided with means for interlocking engagement with each of the drawers, means at the outer rear corners of the drawers for supporting each of the drawers independently, and means for locking the drawers.

2. A filing cabinet comprising two columns of drawers, the drawers of each column being arranged one above the other, means at the inner front corner of each column of drawers for journaling the drawers in such manner that the drawers of one column will swing outwardly toward the drawers of the other column, means for supporting the drawers of each column at their outer rear corners, and means for locking the drawers.

3. A filing cabinet comprising two columns of drawers journaled at their inner front corners and means at their outer rear corners for preventing the dragging of one drawer on the other.

4. A filing cabinet comprising two columns of drawers journaled at their inner front corners, means for preventing the dragging of one drawer on the other and means for locking the drawers.

5. A filing cabinet comprising a column of drawers journaled on a common post one above the other and means at the outer rear corners of the drawers for supporting each drawer independently and for preventing the dragging of one drawer on the other.

In testimony whereof I affix my signature in presence of two witnesses.

CHARLES HUGH DUFFY,
*Administrator of the estate of the late William L. Dunham.*

Witnesses:
 HARRY A. HEGARTY,
 C. MAE GOULD.